United States Patent
Berg et al.

(10) Patent No.: US 6,635,174 B1
(45) Date of Patent: Oct. 21, 2003

(54) FOAMED MATERIAL FILLED WITH INNER MATERIAL

(75) Inventors: Hans Berg, Uppsala (SE); Mats Carlsson, Balinge (SE)

(73) Assignee: Amersham Biosciences AB, Uppsala (SE)

( * ) Notice: Subject to any disclaimer, the term of this patent is extended or adjusted under 35 U.S.C. 154(b) by 0 days.

(21) Appl. No.: 09/979,441

(22) PCT Filed: May 8, 2000

(86) PCT No.: PCT/EP00/04105

§ 371 (c)(1),
(2), (4) Date: Feb. 12, 2002

(87) PCT Pub. No.: WO00/71245

PCT Pub. Date: Nov. 30, 2000

(30) Foreign Application Priority Data

May 20, 1999 (SE) .............................................. 9901825

(51) Int. Cl.$^7$ .............................................. B01D 15/08
(52) U.S. Cl. ................................ 210/198.2; 210/502.1; 210/635; 210/656; 502/401
(58) Field of Search ................. 210/635, 656, 210/659, 198.2, 502.1; 502/401, 402

(56) References Cited

U.S. PATENT DOCUMENTS

| | | | | |
|---|---|---|---|---|
| 5,114,577 A | * | 5/1992 | Kusano | 210/198.2 |
| 5,200,433 A | | 4/1993 | Beshouri | 521/64 |
| 5,271,833 A | * | 12/1993 | Funkenbusch | 210/198.2 |
| 5,334,310 A | | 8/1994 | Frechet et al. | 210/198.2 |
| 5,540,834 A | * | 7/1996 | Carr | 210/198.2 |
| 5,609,763 A | * | 3/1997 | Boschetti | 210/502.1 |
| 5,693,223 A | * | 12/1997 | Yamada | 210/198.2 |
| 5,833,861 A | | 11/1998 | Afeyan et al. | 210/656 |
| 5,906,734 A | * | 5/1999 | Girot | 210/198.2 |
| 5,906,747 A | * | 5/1999 | Coffman | 210/635 |
| 5,977,345 A | * | 11/1999 | Velander | 210/198.2 |
| 6,045,697 A | * | 4/2000 | Girot | 210/635 |
| 6,548,590 B1 | * | 4/2003 | Koloski | 524/492 |

FOREIGN PATENT DOCUMENTS

| | | | |
|---|---|---|---|
| EP | 0 068 310 | 8/1984 | 210/198.2 |
| EP | 0 221 046 | 12/1991 | 210/198.2 |
| EP | 0 288 310 | 10/1992 | 210/198.2 |
| WO | WO 93/07945 A1 | 4/1993 | |
| WO | WO93/19115 | 9/1993 | 210/198.2 |
| WO | WO97/19347 | 5/1997 | 210/198.2 |
| WO | WO97/38018 | 10/1997 | 210/198.2 |

OTHER PUBLICATIONS

L. Hagel, "Pore Size Distributions" P.L. Dubin, editor, Aqueous Size–Exclusion Chromatography, Chapter 5 Elsevier Sciences Publishers B.V., Amsterdam, The Netherlands (1988) pp. 119–155.

* cited by examiner

Primary Examiner—Ernest G. Therkorn
(74) Attorney, Agent, or Firm—Royal N. Ronning, Jr.; Stephen G. Ryan

(57) ABSTRACT

A matrix including: a) a polymeric base matrix including macropores (pore system 1) and b) an interior material, possibly porous (pore system 2), retained within the macropores. The matrix is characterized in that there is a continuous free volume between the interior material and the pore walls of the macropores. A method for manufacturing a matrix including a base matrix having macropores in which an interior material is located. The method is characterized in including the steps: (I) providing a base matrix having macropores; (ii) filling the macropores with a soluble form of the interior material; (iii) transforming the insoluble from to an insoluble form; (iv) shrinking the insoluble form; and (v) irreversibly stabilizing the material in its shrunken form. The matrix can be used in separation methods, cell culturing, solid phase synthesis of organic molecules, and in catalytic reactions (such as enzyme reactions) and other uses in which porous support matrices are used.

20 Claims, No Drawings

FOAMED MATERIAL FILLED WITH INNER MATERIAL

REFERENCE TO RELATED APPLICATIONS

This application is a 371 of PCT/EP00/04105 filed May 8, 2000.

BACKGROUND TECHNOLOGY

In chromatography a flow of liquid containing components to be removed from the liquid is allowed to pass through a separation medium. The components typically differ in their interactions with the separation medium resulting in a differential retention. The components will become at least partially separated from each other. The efficiency of a separation medium will, among others, depend on the surface area available for the solute.

There is a general desire to increase the available surface area in direct contact with the through flowing liquid. In case the liquid is aqueous and the separation media based on a hydrophobic material, a hydrophilic coating has been provided, for instance. Various thicknesses have been suggested from monomolecular and thicker layers permitting through flow in the centre of the pores (EP 221,046 and WO 9719347, respectively) up to filling the through flow pores completely (EP 288,310).

By the term "through flowing liquid" is meant that the liquid provides convective mass transport. Surfaces accessible by the through flowing liquid are therefore called "convective surfaces". Analogously pores/pore systems accessible by the through flowing liquid are called "convective pore systems" (for instance pore system 1 described below). The pore sizes of convective pore systems are typically $\geq 0.1\ \mu m$, such as $\geq 0.5\ \mu m$, by which is meant that a sphere $\geq 0.1\ \mu m$ respective $\geq 0.5\ \mu m$ in diameter is able to pass through. In case the media is in form of beads packed to a bed, the ratio between convective pore sizes and the diameter of the beads typically is in the interval 0.01–0.3, with preference for 0.05–0.2. Pores having sizes $\geq 0.1\ \mu m$, such as $\geq 0.5\ \mu m$, are often called macropores.

Separation media may also have pore systems that are only accessible by diffusion of liquid and/or of components present in the liquid (diffusive mass transport) ("diffusive pore system", for instance pore system 2 as described below when being microporous). Diffusive pore systems are characterized in having openings into the convective pore system, which are not large enough for the liquid flow to pass through. These openings of pore system 2 are typically such that only spheres with diameters $\leq 0.5\ \mu m$, such as $\leq 0.1\ \mu m$, can pass through. Pores having sizes $\leq 0.5\ \mu m$, such as $\leq 0.1\ \mu m$, are often called micropores.

The figures for pore sizes given in the context of the present invention refer to values obtained by SEM or ESEM (scanning electron microscopy and environmental scanninmg electron microscopy, respectively) and/or by SEC (size exclusion chromatography) utilising polystyrenes and dextrans, for instance. See Hagel, "Pore Size Distribution" in "Aqueous Size-Exclusion Chromatography" Elsevier Science Publisher B.V., Amsterdam, The Netherlands (1988) 119–155.

THE OBJECTS OF THE INVENTION

A first object is to increase the total capacity of macroporous matrices.

A second object is to increase the break through capacity of matrices comprising macropores filled up with separation media.

Total capacity and break through capacity refer to the ability of the matrices to interact with a substance present in a liquid that flows through the matrices. The interaction may relate to affinity binding between the substance and a ligand structure having affinity for the substance and being present on the support matrix. The interaction may also be a sterically restricted permeation due to the size and shape of the substance.

THE INVENTION

It has now been recognized that these objects can be met in case the macropores of a base matrix comprise an interior material that leaves a continuous free volume between the interior material and the inner walls of the macropores.

A first aspect of the invention is a support matrix comprising a) a base matrix, preferably polymeric, with macropores (pore system 1) and b) an interior material, possibly porous (pore system 2), retained within the macropores. The characterizing feature of the matrix is a continuous free volume between the interior material and the inner pore walls of the macropores. The support matrices can be in a packed or fluidised bed format or in the form of a monolithic plug. In the preferred variants the continuous free volume permits liquid flow through the matrix, preferably between two opposite ends of the matrix. The dimensions of the continuous free volume are typically selected such that at least 1%, such as at least 4%, of the liquid will pass through the matrix in the continuous free volume. For a matrix in form of a monolithic plug this means 100% liquid flow through the matrix.

Pore Systems

The sizes of the macropores of the empty base matrix without interior material are typically in the interval 0.1–1000 $\mu m$, such as 0.5–1000 $\mu m$, with preference for 1–100 $\mu m$ (pore system 1). The base matrix may also contain a set of less pores (pore system 3) having pores in the interval 10 Å–0.5 $\mu m$, such as 10 Å–0.1 $\mu m$.

The upper limit of the pore sizes (pore system 2) depends on the pore sizes of pore system 1. In case the pores of pore system 1 are sufficiently large, pore system 2 may contain interior material that may or may not be macroporous (pore system 4). Pore system 2 is in the preferred variants microporous, i.e. its pore sizes are $\leq 0.5\ \mu m$, such as $\leq 0.1\ \mu m$. In case pore systems 2 and 4 are macroporous, they can be considered being a part of pore system 1.

The free volume present in the inventive matrices will increase the convective surface area. This will mean faster mass transport and increased break through capacity for interactions with solutes in a through-flowing liquid. The convective surface area of a matrix according to the invention will typically be at least 25%, such as at least 50% or at least 75%, higher than the convective surface of the base matrix without interior material.

The preferred pore systems consist of a three dimensional network of pores, which network comprises a number of pores, pore branches, pore bifurcations etc., and in the preferred variants also cavities communicating with each other via the pores. This applies to macropore systems, including convective pore systems, as well as micropore systems.

In the preferred base matrices, the macropore system is built up of cavities in the form of spheres with connecting pores between the spheres. The diameters of the spheres may be between 1 $\mu m$–100 $\mu m$, such as 1 $\mu m$–25 $\mu m$. The diameters of the connecting pores are normally about $1/10–1/3$ of the diameters of the spheres, for instance between 0.1 µm–10 µm, such as 0.5 µm–10 µm. In case the matrices are in form of beads/particles, the cavities typically have diameters of <$1/9$ of the diameter of the particles.

In some preferred.variants the interior material has a size and/or form prohibiting it to leave the base matrix, i.e. is a so called "jailed interior material".

Base Matrices

Base matrices having pore systems built up by spherical cavities with connecting pores between the cavities )are readily available from the prior art. See for instance U.S. Pat. No. 5,833,861 (PerSeptive Biosystems), EP 288,310 (Unilever), EP 68310 (Unilever), WO 9719347 (Amersham Pharmacia Biotech AB), U.S. Pat. No. 5,334,310 (Cornell Research Foundation), WO 9319115 (Amersham Pharmacia Biotech AB) etc.

The base matrices may in principle be based on materials that in the field are per se known for the manufacture of chromatographic adsorbents in form of monolithic plugs or particles. Thus the main constituent in the base matrix can god be based on organic polymers, such as native polymers (so called biopolymers) and synthetic polymers, and inorganic material. The interior material is primarily based on organic polymers that may be native or synthetic.

Illustrative examples of biopolymers are polysaccharides such as dextran, agarose, cellulose, carageenan, alginate, pullulan, and starch, including also chemically modified forms. Macroporous forms of polysaccharides are best obtained according to the method described in WO 9319115 (Amersham Pharmacia Biotech AB), i.e. initially a water solution containing the polysaccharide material is prepared which then is suspended in a an organic liquid immiscible with water to form an emulsion that upon cooling gives a macroporous block. The method can be modified to give macroporous beads. Macroporous polysaccharide matrices will normally contain both a macropore system (pore system 1) and a micropore system (pore system 3). The pore sizes of the macropore system can be controlled by varying the relative amount of organic liquid and by proper selection of emulsifier during the manufacture of the base matrix. The pore sizes of the micropore system can be controlled by varying the concentration of polysaccharide in the starting aqueous solution. The matrices can be stabilised by cross-linking, for instance by the use of reagents reacting bifunctionally with hydroxy groups. Bisepoxides, epihalo hydrins etc are typical cross-linking agents.

Synthetic polymers are best illustrated by so called vinyl polymers, i.e. polymers obtainable by polymerisation of compounds exhibiting one or more polymerisable alken groups, such as in vinyl benzenes, acrylic/methacrylic acid derivatives (acids, amides, nitrites esters etc). Creation of the base matrix in form of particles may take place o/w-emulsions or suspensions, for instance by polymerisation with the monomers being initially present in the oil phase. By utilizing bulk polymerization monolithic plug matrices can be obtained. By including an organic liquid (porogen) in which the monomers but not the polymer are dissolvable, base matrices having various type of pore structures will be achieved.

The base matrix can also be composed of other synthetic polymers, for instance condensation polymers in which the monomers are selected from compounds exhibiting two or more groups selected among amino, hydroxy, carboxy etc groups. Particularly emphasized monomers are polyamino monomers, polycarboxy monomers (including analogous reactive halides, esters and anhydrides), poly hydroxy monomers, amino-carboxy monomers, amino-hydroxy monomers and hydroxy-carboxy monomers, in which poly stands for two, three or more of the functional group referred to. Compounds containing a functional group that is reactive twice, for instance carbonic acid or formaldehyde, are included in polyfunctional compounds. The polymers contemplated are typically polycarbonates, polyamides, polyamines, polyethers etc.

Examples of inorganic materials that in macroporous forms may be useful in base matrices are silica, zirconium oxide, graphite, tantalum oxide etc.

Preferred matrices lack groups that are unstable against hyrolysis, such as silan, ester, amide groups and groups present in silica as such.

The preferred type of base matrix is obtainable by polymerizing vinyl monomers of the above-mentioned type in a high internal phase emulsion (HIPE) giving a macropore structure comprising open interconnecting spherical cavities of the type described above. See for instance EP 288,310 (Unilever), EP 68,310 (Unilever), WO 9719347 (Amersham Pharmacia Biotech AB) and U.S. Pat. No. 5,200,433. This method has previously been extended to w/o/w emulsions in which the inner w/o-emulsion is in form of drops containing an HIPE. See for instance WO 9531485 which describes beaded forms of this type of matrices. By including a liquid porogen, a micropore system (pore system 3) will be formed in addition to the macropore system comprising spherical cavities. See under the heading "Pore Systems".

In some variants the base matrix may consist of a number of minor particles that irreversibly stick together to form agglomerates. The interstices between the minor particles define the pore systems. These variants may be in the form of larger particles (for instance beads) or monolithic plugs.

The surfaces of the base matrix (for instance of pore system 1) mediating direct contact with a through flowing liquid may be hydrophobic or hydrophilic. By a hydrophilic surface is contemplated that the surface exhibits a plurality of polar groups that contain an oxygen or a nitrogen (hydrophilic groups). Suitable polar groups are hydroxy (alcohol and phenol), carboxy (—COOH/—COO⁻), ester, amide, ether (such as in polyoxyethylene) etc. By the term hydrophobic is meant that there are only a few or none of the above-mentioned hydrophilic groups. In the context of the present invention pronounced hydrophilic surfaces have a water contact angle <30°.

A base matrix having hydrophobic surfaces may easily be hydrophilised according to per se known techniques. Analogously hydrophilic surfaces may be hydrophobised. Pronounced hydrophobic surfaces have a water contact angle >50°.

Interior Material

The interior material is typically a polymer material that preferably is porous (pore system 2).

The interior material is primarily located to macropores in the base matrix in which the macropores have sufficient sizes to provide a continuous free volume as defined above. A portion of the interior material may be located to larger micropores or to macropores not having the sufficient size for providing a continuous free volume.

The interior material may in principle be based on the same kind of materials as the base matrix. See above.

The pore size distribution of pore system 2 may be controlled during the formation of the material according to the same rules as utilized for chromatographic matrices.

The preferred interior material is based on polysaccharides.

The interior material is typically formed within the macropores of the base matrix. One method for this comprises the steps:

i) filling the macropores with a soluble form of the interior material, ii) transforming the soluble form within the macropores to an insoluble form, iii) shrinking the insoluble form and iv) irreversibly stabilising the material in its shrunken form.

This method is best illustrated with polyhydroxy polymers, such as polysaccharides. Aqueous solutions can be prepared of most polysaccharides, either in a native form or in a properly derivatised form. The aqueous solutions of polyhydroxy polymers are often easily transformed to gels as known in the field, either by decreasing the temperature or by chemically derivatization, for instance cross-linking. Agarose, for instance, is known to dissolve in warm water but its solutions gels when the temperature is decreased. Similarly dextran is highly soluble in water but when cross-linked it will form a gel. Gel formation as described above in a macropore system will assist in retaining the polysaccharide within the pore system. It is known that this type of gels may be forced to shrink. Shrinking of a gel located in a macropore system will therefore form a continuous free volume of the type defined above. Properly substituted agarose in gel form, for instance, will shrink upon cross-linking under the appropriate conditions. The cross-linking at the same time leads to an irreversibly stabilised geometric form. See for instance WO 9738018 (page 7, end of $3^{rd}$ paragraph). Similarly, a cross-linked dextran gel swelled in water will shrink in case the water is replaced with a less polar liquid, such as methanol. Upon cross-linking, for instance with bisepoxide or epihalohydrin, the shrunken form of the dextran gel will become irreversibly stabilised.

The general principle outlined in the preceding paragraph is valid for soluble forms of other polymers provided that the soluble forms can be transformed (shrunken) to an insoluble form that occupies a less volume and that the shrunken form can be stabilised irreversibly to this volume. The space between the interior material and the inner walls of the macropores shall be such that there is a continuous free volume, preferably permitting liquid flow through the matrix. In case a soluble form of the polymer can water, other liquids can be used. The soluble forms referred to also include monomers that are able to polymerise to an interior material.

A first alternative for steps (ii)–(iv) above comprises performing these steps essentially simultaneously. A second alternative for steps (ii)–(iv) comprises step (ii) followed by performing steps (iii) and (iv) essentially simultaneously. A third alternative for steps (ii)–(iv) comprises running the sequence step by step. The choice of alternative will depend on the starting soluble form and can be determined as outlined in the experimental part.

Typical methods for transforming a soluble form to an insoluble form (step (ii)) comprise decrease of temperature, chemical derivatization, for instance cross-linking, or solvent/liquid exchange. Typical methods for shrinking (step (iv)) comprise cross-linking, change of ionic strength, or exchange of liquids. For polymers containing a plurality of polar group, going from a more polar liquid to a less polar liquid often cause shrinking. For polymers having a pronounced hydrophobicity, for instance by being essentially free of polar groups, a shrinkage often requires exchanging a less polar with a more polar liquid. Typical methods for stabilisation (step (v)) comprise cross-linking.

A particular useful variant is to utilize a properly allylated polysaccharide, such as agarose, and carry out step (ii) according to the second alternative. The variant outlined above utilizing water-soluble polymers, such as dextran, is according to the third alternative.

The pore surfaces (of the micropores and/or the macropores) may exhibit a plurality of affinity ligands, i.e. structures with affinity for a counterpart. An affinity ligand is an individual member of an affinity pair. Affinity ligands are commonly used to affinity bind (affinity adsorb) the other member of the pair to the support matrix. Well-known affinity pairs are positively and negatively groups (ion exchange), antibodies and antigens/haptens, lectins and carbohydrate structures, IgG binding proteins and IgG, chelate groups and chelating compounds, complementary nucleic acids, hydrophobic groups on the ligand and on the counterpart etc. This type of groups may be introduced onto the support matrix by techniques well known in the field. Affinity groups are of particular interest when utilizing the novel support matrices of the present invention in separation methods based on affinity for a substance to be purified or removed from a liquid containing the substance. They may also be of interest for matrices that are used as support in cell culture and in solid phase synthesis and as support for catalysts, such as enzymes.

In case the support matrices as defined above are used for affinity adsorption, the support matrix exhibits a member of an affinity pair as defined above. The use comprises bringing the support matrix and a polar liquid, typically an aqueous liquid, or "non"-polar liquid containing the other member of the affinity pair in contact with each other. The conditions are selected to promote affinity binding and are in principle regarded as per se known in the field. Subsequently the support matrix is separated from the liquid, and, if so desired, the affinity-adsorbed member can be released and further processed.

The invention will now be illustrated by examples. The invention is further defined in the patent claims that are part of the specification.

EXPERIMENTAL PART

SYNTHESIS

Example 1A

Controlled Shrinking of Agarose

Preparation of agarose solution. An agarose solution was prepared in a batch reactor by adding 20 g agarose to 300 ml distilled water under stirring for 2 h at 95° C. The solution was cooled to 70° C. 1.5 ml NaOH 50%, 0.04 g NaBH$_4$ and 4.0 ml allyl glycidyl ether were added to the agarose solution. The reaction was allowed to continue for 2 h under stirring at 70° C. The solution was then neutralised with 60% acetic acid and HCl to pH=7–8.

Preparation of emulsion media. This was done in an emulsion reactor by adding 35 g ethyl cellulose (N-50 emulsifier (ethyl cellulose, Hercules, U.S.A.) to 450 ml toluene under stirring at 60° C. (dissolving of N-50 in toluene takes approximately 2 h).

Emulsion. The agarose solution was transferred to the emulsion media. The stirring was regulated to 120 rpm. Agarose gel particles were thereby formed.

The desired maximal particle size of agarose beads was 160 μm. If the agarose gel particles were too large the rotation speed was increased up to 220 rpm and extra N-50 be added. The maximal particle size was checked by taking samples, which were analysed in a microscope with a built-in size graduation. Once the 160 μm size was reached, the slurry was cooled down. The slurry was cooled from 60° C. to <25° C. in approximately 30 min. The gel was washed with ethanol 99.5% and distilled water.

Cross-linking with epichlorohydrin (shrinking step). 53 g $Na_2SO_4$ were added to a reactor containing a mixture of 320 ml gel (drained) and 130 ml distilled water under stirring. The reaction temperature was increased to 50° C. and after 1 h, 7 g 50% NaOH and 0.5 g $NaBH_4$ were added to the slurry as well as 47 g 50% NaOH and 34 ml epichlorohydrin, which were added during a period of 6–8 h. The reaction was allowed to continue over night (ca. 16 h). The gel was washed with distilled water and 60% acetic acid to pH=5–7.

Shrinkage (calculations). The volume of the gel before ($V_0$) and after ($V_{cl}$) cross-linking was measured and the shrinkage in percentage was calculated according to the formula:

$$Shrinkage = (1-(V_{cl}/V_0)) \times 100$$

Degree of Derivatization Versus Shrinking Behavior

The shrinkage study according to example 1a was repeated twice with different amounts of allyl glycidyl ether. The results are disclosed in table 1 below.

TABLE 1

| Allyl glycidyl ether M1 | Shrinkage % |
|---|---|
| 4.0 | 41 |
| 2.7 | 31 |
| 2.0 | 24 |

Example 1B

Controlled Shrinkage of Dextran Gels

Preparation of Sephadex G-200 slurry. 3 g of Sephadex G-200 (dextran gel cross-linked with epichlorohydrin, Amersham Pharmacia Biotech AB, Sweden) were added to 400 ml distilled water. The gel was allowed to swell for 24 h under stirring at 20–25° C. The volume of the gel (drained) after swelling was 100 ml.

Shrinking and Cross-linking With 1,4-Butanediol Diglycidylether.

5,5 ml drained dextran gel and 0.5 ml distilled water were added to a reactor containing 6.0 ml methanol. After 1 h, 3 ml 1,4-butanediol diglycidylether and 0.13 ml 50% NaOH were added to the slurry. The reaction temperature was increased to 50° C. The reaction was allowed to continue over night. The gel was washed with distilled water.

Shrinkage (calculations). See example 1A.

Amount of Methanol Versus Shrinking Behavior

The shrinkage study according to example 1A was repeated twice with different amounts of methanol. The results are disclosed in table 2 below.

TABLE 2

| Methanol M1 | Shrinkage % |
|---|---|
| 6.0 | 46 |
| 5.0 | 27 |
| 4.0 | 9 |

Example 2

Manufacture of Macroporous Material and Hydrophilisation Thereof

Macroporous base matrix. A macroporous base matrix (beads, diameter 40–500 μm, pore system in form of inter connected spherical cavities) was prepared according to Example 1 in WO 9719347 (Amersham Pharmacia Biotech AB) from 10.8 g styrene, 10.8 g divinyl benzene (Grade 63%), 1.8 g Span® 80 (sorbitan monooleate, Fluka, Germany), 0.8 g Hypermer® (ICI, England), 139 g distilled water (first step) and 324 g distilled water (second step). Particles which were larger than 500 μm and smaller than 40 μm were removed by sieving.

Surface modification by adsorption of polyhydroxy polymer. 20 g phenyl dextran (substitution degree 0.20 per monosaccharide unit) were added to a reactor containing a mixture of 1500 ml drained macroporous matrix and 500 ml distilled water under stirring. The reaction was allowed to proceed for 2 h under stirring at 20–25° C. The gel was washed with distilled water.

Cross-linking of adsorbed phenyldextran. 180 g $Na_2SO_4$ were added to a reactor containing a mixture of 1000 ml of the drained macroporous matrix to which phenyl dextran had been adsorbed and 300 ml of distilled water under stirring. The reaction temperature was increased to 50° C. and after 1 h, 40 g 50% NaOH and 32 ml 1,4-butanediol diglycidyl ether were added to the slurry. The reaction was allowed to continue over night (ca. 16 h). The gel was washed with distilled water and 60% acetic acid to pH 5–7.

Example 3

Manufacture of Macroporous Matrix Containing in its Macropores a Porous Material Leaving a Free Volume Example 3A Preparation of Agarose Solution An agarose solution was prepared in a batch reactor by adding 120 g agarose to 900 ml distilled water under stirring for 2 h at 95° C. The solution was then cooled to 70° C.

Example 3B

Preparation of macroporous matrix filled with allylated agarose gel. 150 g of drained macroporous matrix from Example 2, 1.5 ml NaOH 50% and 3 ml allyl glycidyl ether were added to 170 g agarose solution from example 3a. The reaction was allowed to continue for 2 h under stirring at 70° C. The solution was then neutralised with 60% acetic acid and HCl to pH=7–8.

Preparation of emulsion media. This was prepared in an emulsion reactor by adding 55 g ethyl cellulose (N-50 emulsifier) to 450 ml toluene under stirring at 60° C. (the dissolving of N-50 in toluene takes approximately 2 h).

Removal of excess agarose gel. The agarose/drained matrix slurry was transferred to the emulsion media. The stirring was regulated to 180 rpm. Agarose gel particles were thereby formed and their sizes can be controlled by variation of the rotation speed of the stirrer and the addition of extra N-50.

The desired maximal particle size of agarose beds was 20 μm. If the agarose gel particles were to large the rotation speed can be increased up to 220 rpm and extra N-50 can be added. The maximal particle (agarose) size was controlled by taking samples which were analysed in a microscope with a built-in size graduation. Once the diameter size 20 μm were reached, the slurry was cooled down from 60° C. to <25° C. in approximately 30 min. The gel was washed with ethanol 99,5% and distilled water. Particles smaller than 40 μm (agarose beads) were removed by sieving.

Cross-linking with epichlorohydrin (shrinking). 57 g $Na_2SO_4$ were added to a reactor containing a mixture of 120 ml macroporous material (from example 3B, drained) filled with agarose and 50 ml distilled water under stirring. The reaction temperature was increased to 50° C. and after 1 h, 3 g 50% NaOH and 0,2 g $NaBH_4$ were added to the slurry as well as 18 g 50% NaOH and 17 ml epichlorohydrin, which were added during a period of 6–8 h. The reaction was allowed to continue over night (ca. 16 h). The gel was washed with distilled water and 60% acetic acid to pH=5–7.

Inactivation of Allyl Groups

Bromination: 50 g NaAc x $3H_2O$ (sodium acetate) were added to a reactor containing a solution of 120 ml epichlorohydrin cross-linked gel (drained) and 350 ml distilled water under stirring. After 5 min, bromine-water ($Br_2/H_2O$) was added to the solution until a dark yellow colour was obtained and maintained for over 1 min. The reaction was allowed to continue for approximately 15 min. Thereafter sodium formiate was added, giving the gel a white colour.

10 g $Na_2SO_4$ were added to a reactor containing the brominated gel. After 1 h, 30 g 50% NaOH and 0,04 g $NaBH_4$ were added to the solution. The reaction temperature was increased to 40° C. and the reaction was allowed to proceed for 16 h. The gel was then washed with distilled water until pH=7. Particles which were lager than 250 μm and smaller than 40 μm were removed by sieving.

Preparation of dextran solution. 17 g dextran (T40 Mw 40,000 Amersham Pharmacia Biotech AB) were added to 14 ml distilled water under stirring at 20° C. (the dissolving of dextran in water takes approximately 4 h).

Epoxide activation of the macroporous matrix filled with agarose. 6.4 g of NaOH (50%) were added to a reactor containing a solution of 40 ml of the matrix (drained) and 16 ml of distilled water while stirring. The mixture was cooled to 20° C. 7.2 ml of epichlorohydrin were added. The reaction was allowed to continue for 2 h at 20° C. The mixture was then neutralised with acetic acid to pH=6–7 and the activated matrix was washed with distilled water. Analysis showed 13 μmol epoxide groups/ml of gel.

Dextran coupling. The epoxide activated gel was added to the reactor containing the dextran solution. The mixture was stirred for 1 h. 3.2 g of NaOH (50%) and 0.02 g of NaBH were then added and the reaction was permitted to continue over night (ca. 18 h). The mixture was then neutralised with acetic acid to pH=6–7 and the matrix was washed with distilled water The dextran content of the matrix after reaction was 13 mg/ml of gel Introduction of guaternary aioethyl groups (Q-groups) (anion exchanger). 35 ml of glycidyl trimethyl ammonium chloride (70%) were added under stirring to a solution containing 20 ml of the matrix from the preceding step and 1.2 ml of NaOH (50%). The reaction temperature was increased to 30° C. and the reaction permitted to proceed for 19 h. The mixture was then neutralised with acetic acid to pH=6–7 and the resulting matrix washed with distilled water, 2M NaCl and with distilled water once more. The chloride ion capacity of the product was 0.18 mmol/ml of gel.

Example 3C

Macroporous Matrix Filed With Non-shrunken Porous Interior Material

Preparation of macroporous matrix filled with agarose gel. 150 g macroporous matrix (drained) from Example 2 were added to 170 g agarose solution from Example 3a. The slurry was kept stirring for 2 h at 70° C.

Preparation of emulsion media. Analogous to Example 3b. 70 g ethyl cellulose (N-50 emulsifier), 450 ml toluene.

Removal of excess agarose gel. Analogous to Example 3b. The same kind of matrix beads.

Cross-linking with epichlorohydrin. Analogous to Example 3b. 22 g $Na_2SO_4$ 123 ml matrix beads filled with agarose, 57 ml distilled water 2 g 50% NaOH, 0.2 g $NaBH_4$, 19 g 50% NaOH and 18 ml epichlorohydrin. Particles which were lager than 250 μm and smaller than 40 μm were removed by sieving.

Preparation of dextran solution. Analogous to Example 3b. 14.8 g dextran and 14 ml distilled water.

Epoxide activation of the macroporous matrix filled with agarose. Analogous to Example 3b. 6.4 g of NaOH (50%), 40 ml of the matrix and 16 ml of distilled water, 7.2 ml of epichlorohydrin. Analysis showed 29 μmol epoxide groups/ml of gel.

Dextran coupling. Analogous to Example 3b. 3.2 g of NaOH (50%) and 0.02 g of NaBH. The dextran content of the matrix after reaction was 17 mg/ml of gel.

Introduction of quaternary aminoethyl groups (Q-groups) (anion exchanger). Analogous to Example 3b. 35 ml of glycidyl trimethyl ammonium chloride, 20 ml of the matrix and 1.2 ml of NaOH (50%). The chloride ion capacity of the produkt was 0.29 mmol/ml of gel.

METHODS OF ANALYSIS

Epoxide contents was determined on a Radiometer VIT 90 with 0.1 M HCl, pH-stat endpoint pH 7.

Dextran contents were determined by calculating the difference between the dry weight of the dextran coupled and the epoxy activated gel. The dry weight was determined after drying 18 h in a oven at 105° C. and expressed as mg dextran per ml of gel.

Chloride ion capacity was determined on a Mettler DL40Gp Memo Titrator with 0.1 M $AgNO_3$.

Breakthrough capacity $Q_B$ ($C/C_0=0.1$) for BSA (bovine serum albumin) at 300 cm/h and 1200 cm/h.

| Equipment: | |
|---|---|
| Column: | HR10/10 (Amersham Pharmacia Biotech AB, Sweden) |
| A-buffer; Loading buffer: | 50 mM Tris, pH 8.0 |

Procedure:

The breakthrough capacity $Q_B$ was determined on a ER 10/10 column (bed height of 7.5 cm gel). The protein was dissolved in buffer A, approximately 2 mg/ml (determined spectrophotometric at 280 nm). The column was initially bypassed and the flow delivered direct to the UV monitor, in which an absorbance value 280 nm of the non-adsorbed sample solution was measured ($C_0$), whereafter the flow adsorbed sample solution was allowed to pass trough the column. When the absorbance of the flow trough the column was 10% of the absorbance $C_0$, the test was interrupted, the gel was washed and the BSA bound to the gel was eluated with buffer B. The eluate was collected and its BSA content determined, which in turn gave the amount of adsorbed BSA per ml of gel (=the breakthrough capacity ($Q_B$) for $C/C_0$=0.1)

The results from examples 3a and 3b are presented in table 3.

TABLE 3

| Example No. | According to the invention | $Q_B$ mg BSA per ml gel Flow: 300 cm/h | $Q_B$ mg BSA/ml gel Flow: 1200 cm/h |
| --- | --- | --- | --- |
| Example 3b | Yes | 124 | 88 |
| Example 3c | No | 63 | 36 |

The results show an increased break through capacity for the matrix prepared in Example 3b.

Results of Environmental Scanning Electron Microscopying:

The beads were partly crossed before being studied. The photos showed broken up beads with cavities and smaller beads of the interior material. The smaller beads had fallen out of the cavities.

What is claimed is:

1. A matrix having increased total capacity and increased break through capacity comprising a) a base matrix comprising macropores (pore system 1) and b) an interior material retained within the macropores, wherein there is a continuous free volume between the interior material and the pore walls of the macropores.

2. The matrix of claim 1, wherein the continuous free volume permits liquid flow through the matrix of when a liquid flow is applied to a monolithic form of the matrix or to a packed bed of the matrix in form of particles such that at least 1% of a liquid passing through the matrix passes through the continuous free volume.

3. The matrix of claim 2, wherein
   a) when the liquid is polar, the pore walls in pore system 1 and/or the outer surface of the interior material are hydrophilic, or
   b) when the liquid is non-polar, the pore walls in pore system 1 and/or the outer surface of the interior material are hydrophobic.

4. The matrix of claim 2, wherein the matrix is in form of a monolithic plug and that 100% of the liquid flows through the matrix.

5. The matrix of claim 2, wherein the matrix is in the form of particles in a packed bed, at least 1% of the liquid flows through the particles.

6. The matrix of claim 2, wherein the continuous free volume permits liquid flow through the matrix between two opposite ends of the matrix.

7. The matrix of claim 1, wherein the pore diameter of the macropores (pore system 1) is in the interval 0.1–1000 μm.

8. The matrix of claim 1, wherein said matrix is in the form of particles (beads) having an average size in the interval 5–1000 μm, and that the ratio between the pore diameter of pore system 1 and the particle diameter is in the interval 0.01–0.3.

9. The matrix of claim 8, further comprising a third pore system (pore system 3) in the base matrix, and wherein one or both of said pore systems 2 and 3 having openings into the continuous free volume that only permit diffusive mass transport.

10. The matrix of claim 9, wherein the pore walls in pore system 3 include one or more affinity structures.

11. The matrix of claim 1, wherein the macropores (pore system 1) comprise empty spherical cavities and empty pores being smaller than the cavities and connecting individual cavities via openings in the surfaces of the cavities.

12. The matrix of claim 11, wherein the interior material is mainly located in the cavities with the continuous free volume extending between the interior material and the inner walls of the macropores.

13. The matrix of claim 1, wherein the base matrix and/or the interior material are/is of inorganic or organic origin.

14. The matrix of claim 1, wherein the interior material and/or the walls of the macropores include one or more affinity structures.

15. The use of the matrix of claim 1 for separation by causing a liquid containing substances that are to be removed from the liquid to flow through the matrix.

16. The matrix of claim 1, wherein the interior material is porous (pore system 2).

17. The matrix of claim 16, wherein the continuous free volume permits liquid flow through the matrix when a liquid flow is applied to a monolithic form of the matrix or to a packed bed of the matrix in form of particles such that at least 1% of a liquid passing through the matrix passes through the continuous free volume.

18. The matrix of claim 17, wherein the continuous free volume permit liquid flow through the matrix between two opposite ends of the matrix.

19. The matrix of claim 17, wherein
   a) when the liquid is polar, the pore walls in pore system 2 are hydrophilic; or
   b) when the liquid is non-polar, the pore walls in system 2 are hydrophobic.

20. The matrix of claim 1, wherein the base matrix is a hydrophilic or hydrophobic polymer selected from the group consisting of copolymers of divinyl or monovinyl monomers.

* * * * *